United States Patent
Sakata et al.

(10) Patent No.: US 9,084,198 B2
(45) Date of Patent: Jul. 14, 2015

(54) WIRELESS COMMUNICATION SYSTEM AND WIRELESS COMMUNICATION APPARATUS, BOTH FOR USE IN BROADCAST WIRELESS TRANSMISSION

(71) Applicant: KABUSHIKI KAISHA TOSHIBA, Minato-ku, Tokyo (JP)

(72) Inventors: Ren Sakata, Yokohama (JP); Toshihisa Nabetani, Kawasaki (JP); Noritaka Deguchi, Yokohama (JP); Michio Kanayama, Fuchu (JP); Shinsuke Watanabe, Tokyo (JP); Mitsuaki Suzuki, Tachikawa (JP); Masakuni Akashi, Tokyo (JP); Shuji Sato, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 207 days.

(21) Appl. No.: 13/841,671

(22) Filed: Mar. 15, 2013

(65) Prior Publication Data
US 2013/0210478 A1    Aug. 15, 2013

Related U.S. Application Data

(63) Continuation of application No. PCT/JP2011/059635, filed on Apr. 19, 2011.

(30) Foreign Application Priority Data

Sep. 21, 2010    (JP) .................................. 2010-211278

(51) Int. Cl.
| | |
|---|---|
| H04B 7/00 | (2006.01) |
| *H04W 52/04* | (2009.01) |
| *H04W 52/28* | (2009.01) |
| H04W 24/08 | (2009.01) |
| H04W 52/36 | (2009.01) |

(52) U.S. Cl.
CPC ............ *H04W 52/04* (2013.01); *H04W 52/283* (2013.01); *H04W 24/08* (2013.01); *H04W 52/36* (2013.01)

(58) Field of Classification Search
CPC .............................. H04W 52/00; H04W 64/00
USPC .......... 455/522, 69, 456.1, 552.1, 456.3, 507, 455/509, 67.11
See application file for complete search history.

(56) References Cited

U.S. PATENT DOCUMENTS

| 8,730,337 B2 * | 5/2014 | Inoue et al. ................. 348/211.5 |
| 2005/0047373 A1 * | 3/2005 | Kojima .......................... 370/331 |

(Continued)

FOREIGN PATENT DOCUMENTS

| CN | 1863019 A | 11/2006 |
| JP | 2005-348433 A | 12/2005 |

(Continued)

OTHER PUBLICATIONS

International Search Report (ISR) dated May 24, 2011 (and English translation thereof) issued in parent International Application No. PCT/JP2011/059635.

(Continued)

*Primary Examiner* — John J Lee
(74) *Attorney, Agent, or Firm* — Holtz, Holtz, Goodman & Chick PC

(57) ABSTRACT

According to one embodiment, a wireless terminal communicates with a server via wireless base stations. The wireless terminal has devices which transmit a signal in a normal-power transmission mode and the signal in a low-power transmission mode, a power control device which switches the normal-power transmission mode to the low-power transmission mode, or vice versa, and a device which transmits current position data to the server. The server detects the position of the wireless terminal, designates one of the base stations which is close to the wireless terminal, when the wireless terminal is set to the low-power transmission mod, and detects whether the base station designated has a problem or not according to detect the signal from the wireless terminal.

10 Claims, 9 Drawing Sheets

(56) References Cited

U.S. PATENT DOCUMENTS

| | | | |
|---|---|---|---|
| 2005/0107080 A1 | 5/2005 | Hasegawa et al. | |
| 2006/0038719 A1* | 2/2006 | Pande et al. | 342/357.12 |
| 2006/0217073 A1 | 9/2006 | Saitou et al. | |
| 2008/0139198 A1 | 6/2008 | Saitou et al. | |
| 2010/0075709 A1 | 3/2010 | Nakano et al. | |

FOREIGN PATENT DOCUMENTS

| | | |
|---|---|---|
| JP | 2006-319617 A | 11/2006 |
| JP | 2009-105935 A | 5/2009 |
| JP | 2010-74695 A | 4/2010 |

OTHER PUBLICATIONS

Written Opinion of the International Searching Authority (PCT/ISA/237) dated May 24, 2011 issued in parent International Application No. PCT/JP2011/059635.

International Preliminary Report on Patentability (in English); dated Apr. 25, 2013; issued in International application No. PCT/JP2011/059635.

Chinese Office Action dated Jan. 4, 2015, issued in counterpart Chinese Application No. 201180039425.8.

* cited by examiner

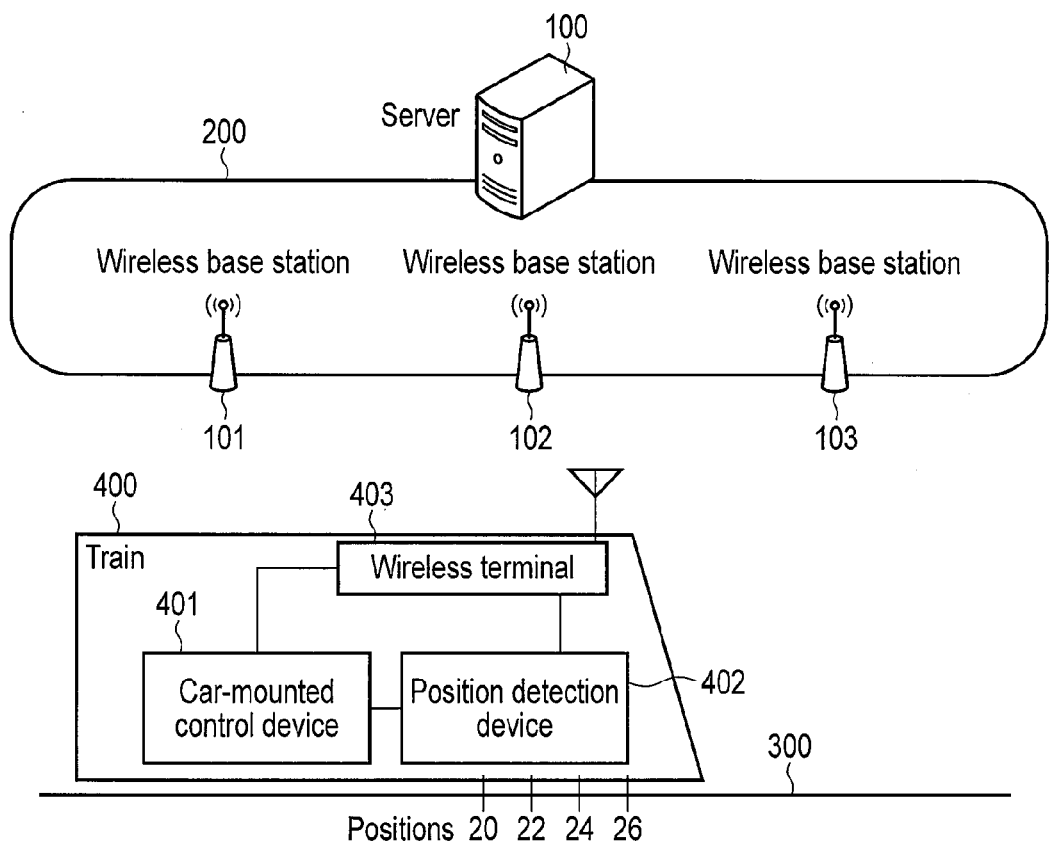
F I G. 1

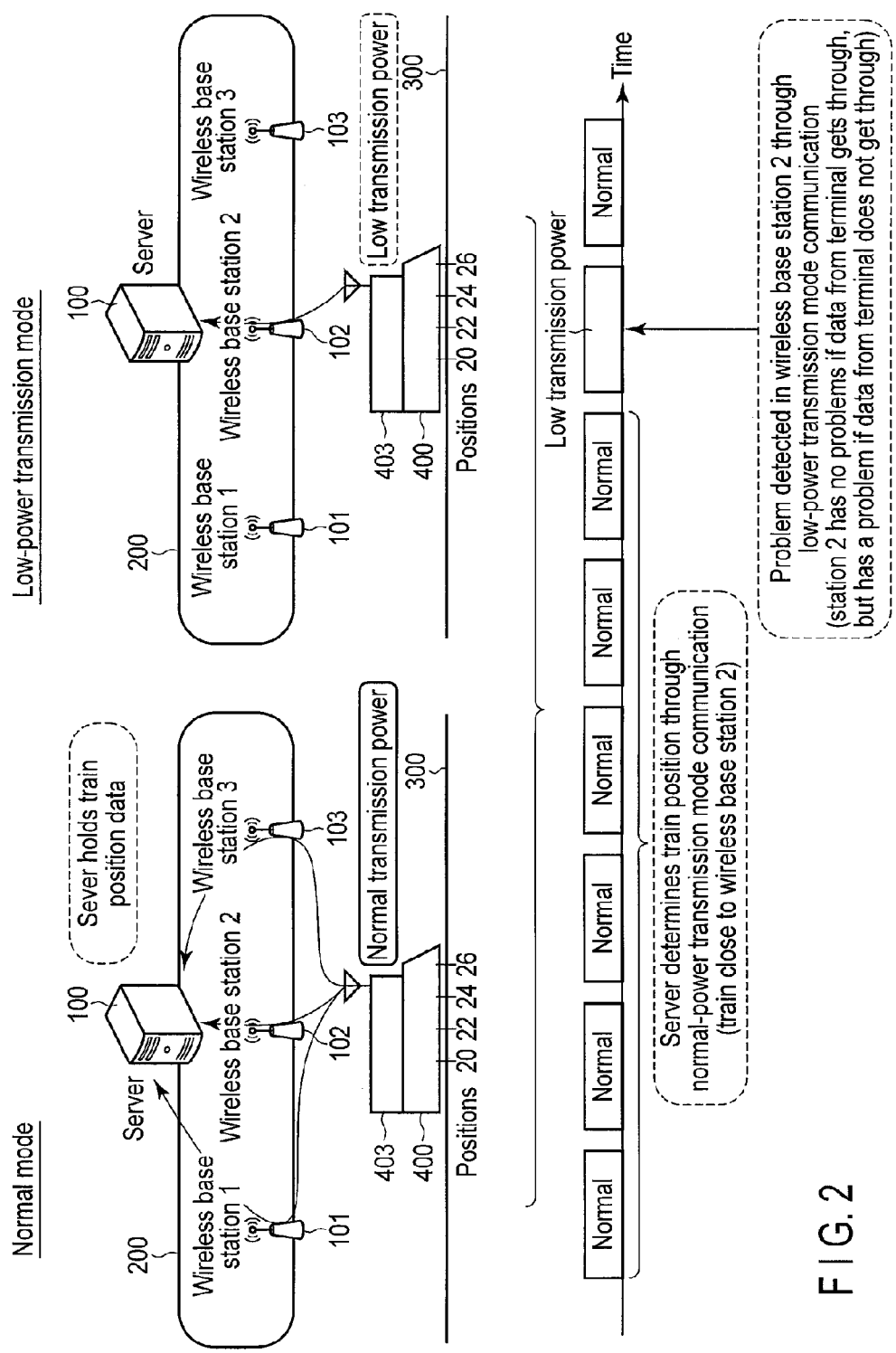
F I G. 2

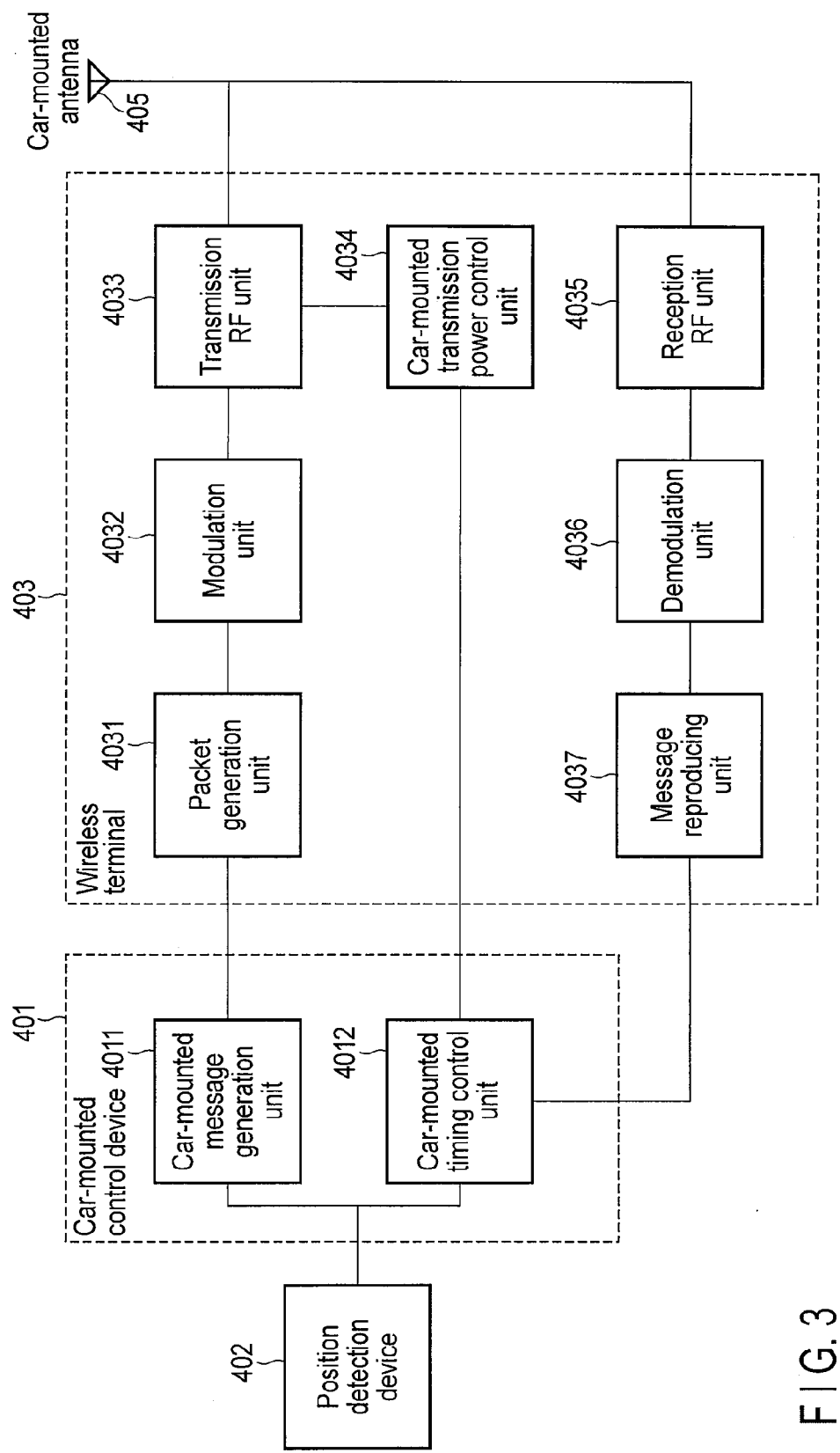
F I G. 3

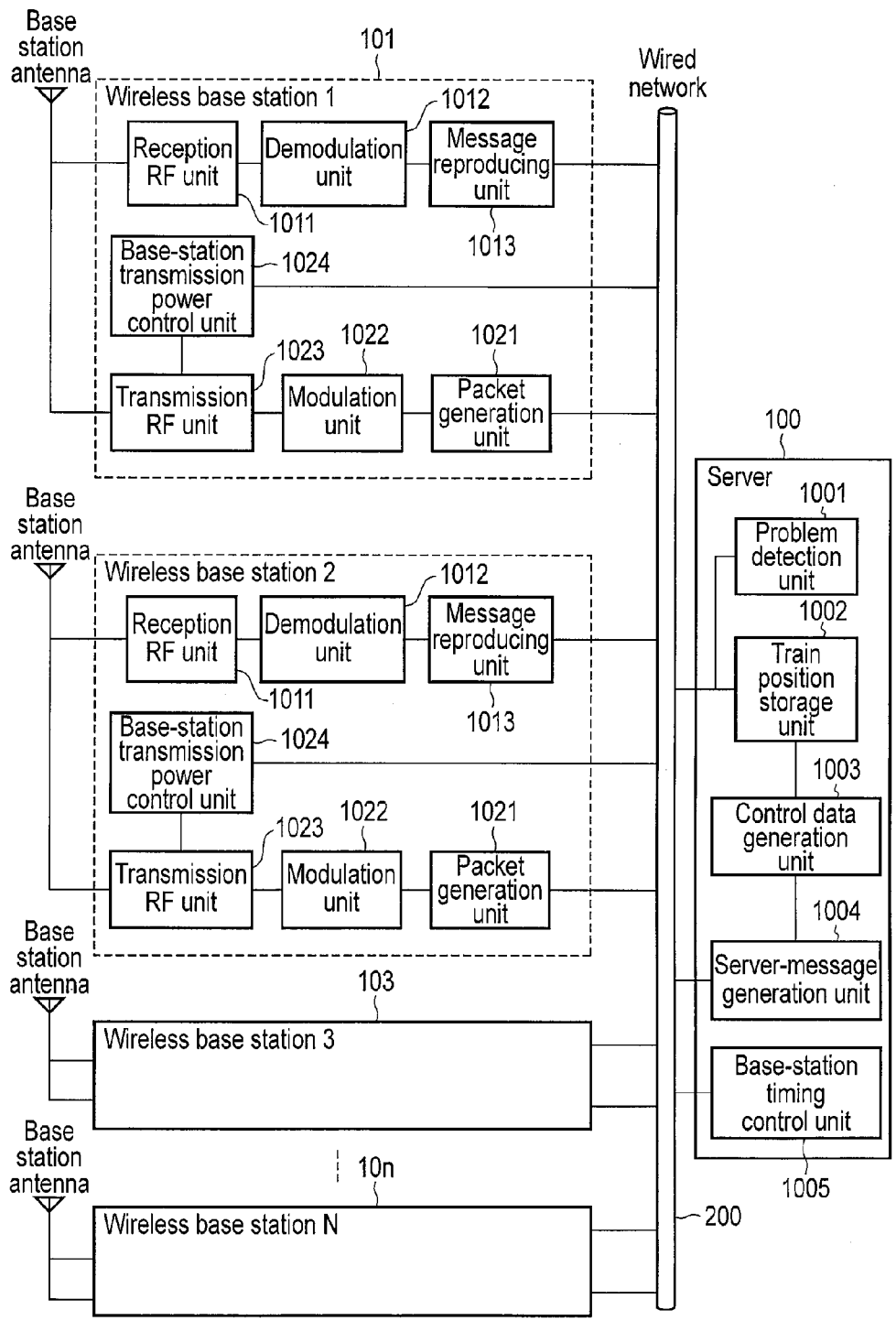
F I G. 4

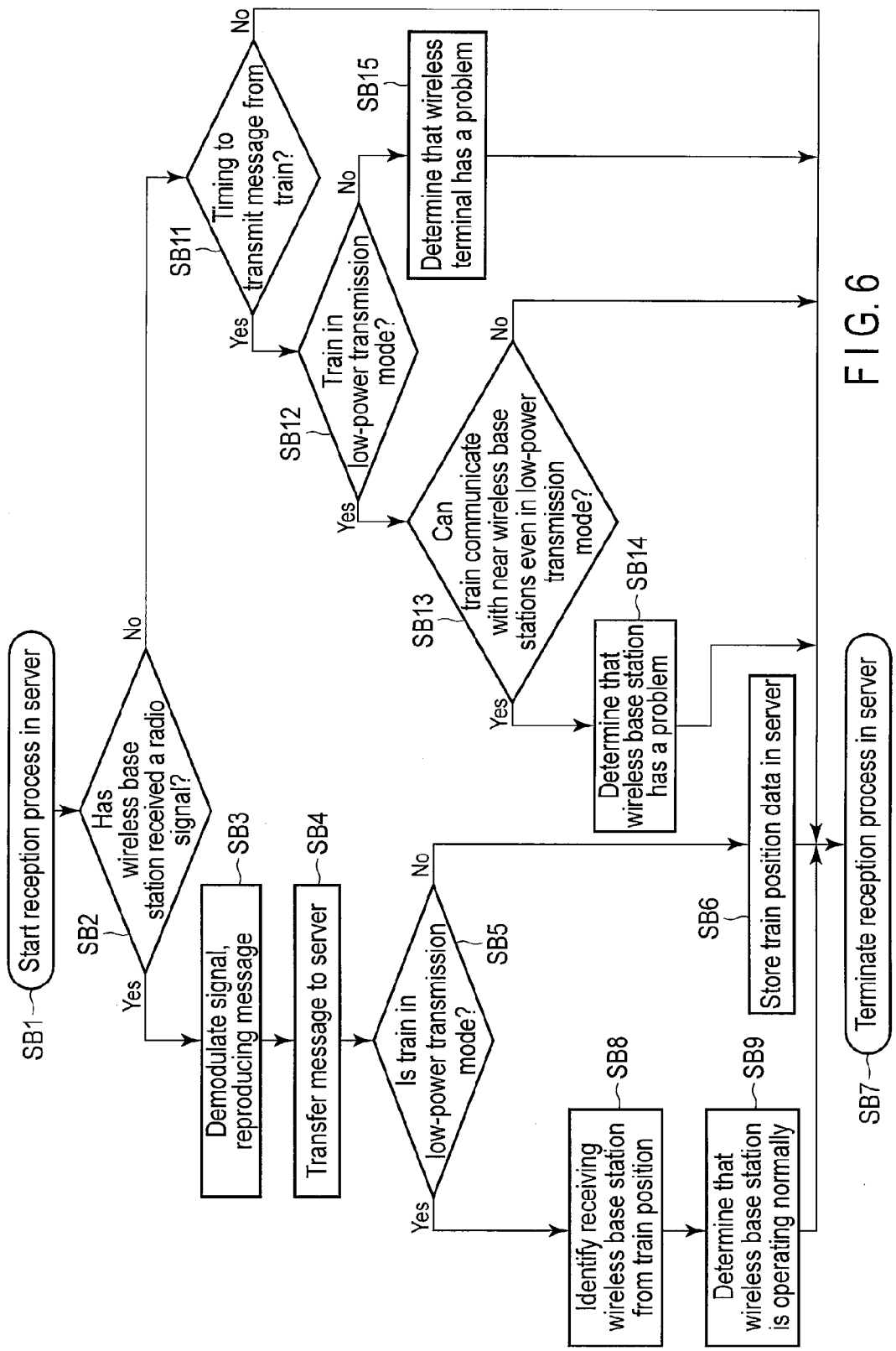
F I G. 6

WIRELESS COMMUNICATION SYSTEM AND WIRELESS COMMUNICATION APPARATUS, BOTH FOR USE IN BROADCAST WIRELESS TRANSMISSION

CROSS REFERENCE TO RELATED APPLICATIONS

This application is a Continuation Application of PCT Application No. PCT/JP2011/059635, filed Apr. 19, 2011 and based upon and claiming the benefit of priority from Japanese Patent Application No. 2010-211278, filed Sep. 21, 2010, the entire contents of all of which are incorporated herein by reference.

FIELD

Embodiments described herein relate generally to a wireless communication system and a wireless communication apparatus, both for use in broadcast wireless transmission.

BACKGROUND

A communication system is known, in which a plurality of wireless base stations are arranged, each connected to a server, and wireless terminals can communicate with the server via the wireless base stations. In this communication system, each wireless terminal uses broadcast transmission that does not designate, as an addressee, any wireless base station and, can yet transmit data to the wireless base stations. The server can therefore utilize those of the signals received at the wireless base stations, which are correct, thereby increasing the reliability of transmission.

The wireless base stations may transmit identical signals to each wireless terminal. In this case, any signal transmitted will reach the wireless terminal with a higher probability than otherwise. This can improve the reliability of the data transmission.

Hitherto, each base station gives each terminal minute instruction, causing the terminal to receive any signal at the smallest power possible, thereby minimizing the power the terminal needs to transmit data.
Prior-Art Documents
Patent Document 1:
 Jpn. Pat. Appln. KOKAI Publication No. 2005-348433

BRIEF DESCRIPTION OF THE DRAWINGS

FIG. 1 is a diagram showing the configuration of a system according to an embodiment;

FIG. 2 is a diagram schematically showing how the embodiment operates;

FIG. 3 is a diagram showing the devices mounted on a train incorporated in the embodiment;

FIG. 4 is a diagram showing the configuration of the apparatus according to the embodiment, which is provided trackside;

FIG. 6 is a diagram showing the flow of operation performed trackside;

DETAILED DESCRIPTION

Figure 5:
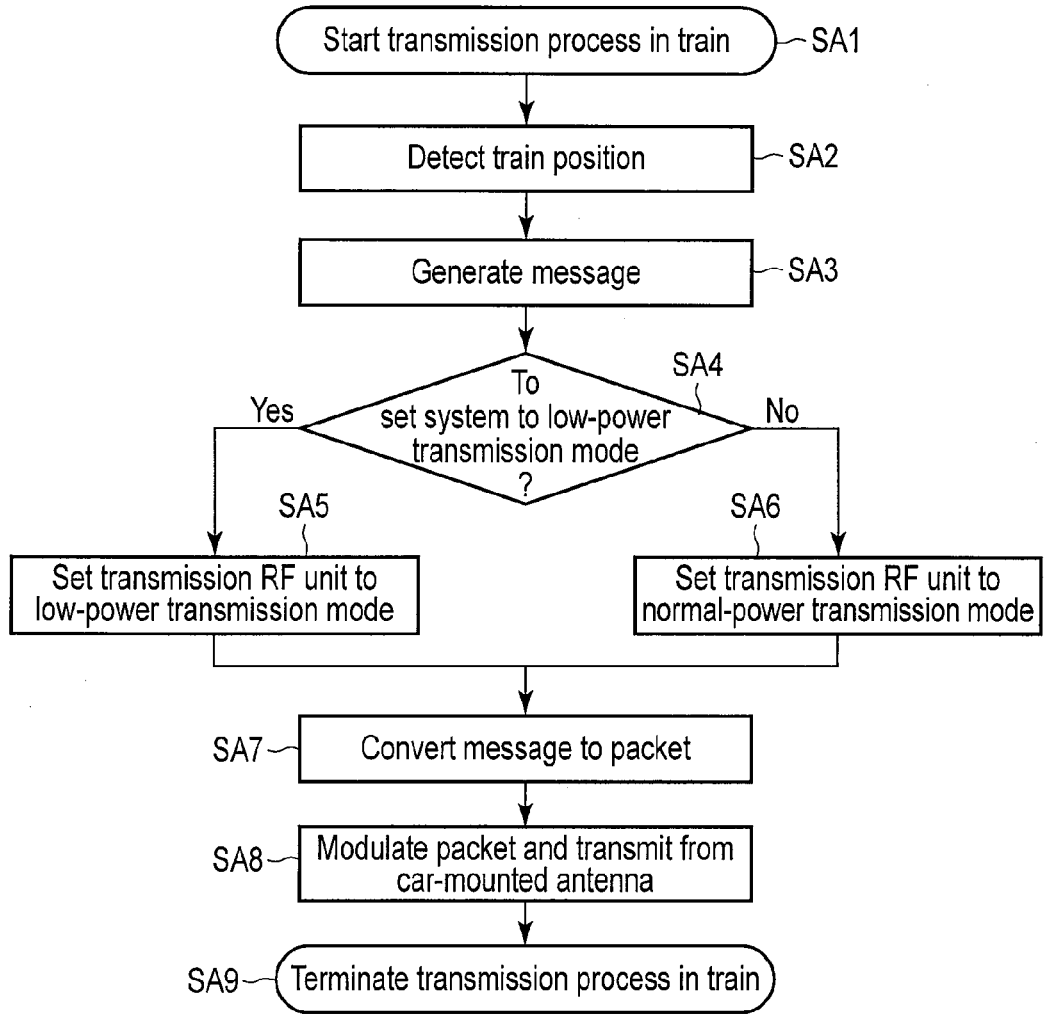
FIG. 5 is a diagram showing the operation sequence in the train.

In general, according to one embodiment, a wireless communication system in which a wireless terminal communicates with a server via a plurality of base stations. The wireless terminal comprises a means for transmitting a signal at normal power in a normal-power transmission mode; a means for transmitting the signal at a power less than the normal power in a low-power transmission mode; a transmission power control means for switching the normal-power transmission mode to the low-power transmission mode, or vice versa; and means for transmitting current position data to the server. The server comprises means for determining the position of the wireless terminal from the position data received from the wireless terminal; means for designating one of the base stations, which is close to the wireless terminal, in accordance with the position data when the wireless terminal is set to the low-power transmission mode; and means for determining that the base station designated or the wireless terminal has a problem if the server does not receive the signal the wireless station has transmitted in the low-power transmission mode.

Exemplary embodiments will be described in detail, with reference to the accompanying drawing.

First Embodiment

Power is Reduced in Terminals at Intervals

System Configuration

The first embodiment will be described with reference to FIG. 1. FIG. 1 is a diagram showing the configuration of the system according to this embodiment. This embodiment is designed to achieve communication between a server 100 provided trackside (or in a stationary facility) and a train 400 running on rails 300. Trackside, a plurality of wireless base stations 101, 102, 103, . . . and the server 100 are installed. A network 200 connects wireless base stations 101, 102, 103, . . . to the server 100.

In the train 400, which is the moving side (or mobile section), a car-mounted control device 401, a position detection device 402, and a wireless terminal 403 are arranged. The wireless terminal 403 performs wireless communication with wireless base stations 101, 102, 103, . . . . Assume that the data is transmitted between the wireless terminal 403 and wireless base stations 101, 102, 103, . . . by means of broadcast transmission that does not designate an addressee.

The broadcast transmission enables wireless base stations 101, 102, 103, . . . to receive a signal transmitted from the wireless terminal 403. Therefore, if any of the wireless base stations fails to receive signals, the wireless terminal 403 can maintain communication with the server 100. This can enhance the reliability of the communication system.

Assume that the server 100 transmits a signal to the wireless terminal 403 through wireless base stations 101, 102, 103, . . . . Then, the server 100 can communicate with the wireless terminal 403, no matter where the train 400 is, as long as it receives a signal from one of wireless base stations 101, 102, 103, . . . .

Also assume that the position of the train 400 can be determined by the position detection device 402. The position detection device 402 is, for example, a global positioning system (GPS), or a tachogenerator that counts the rotations of an axle of the train 400. The position detection device 402 may be of any other type, and a train position detection system can be utilized.

Basic Concept

FIG. 2 is a diagram showing the basic concept of this invention. Assume that the wireless terminal 403 has an operating mode called normal-power transmission mode (shown in the left half of FIG. 2). The wireless terminal 403 transmits a signal by means of broadcast transmission. In the normal-power transmission mode, the wireless terminal 403 transmits a signal at the normal transmission power. Wireless base stations 101, 102, 103, . . . receive the signal transmitted from the wireless terminal 403. The communication between the wireless terminal 403 and the server 100 therefore continues even if some of the base stations have a problem. Thus, the probability of communication failure can be reduced.

While the broadcast transmission is being used, a wireless base station may have a problem. Even in this case, it cannot be determined which wireless base station has the problem since the signal received by any of the other wireless base stations reaches the server 100. Assume that the train 400 transmits the data representing its position to the server 100 through the wireless terminal 403 and wireless base stations 101, 102, 103, . . . , and that the server 100 keeps holding the data representing the position of the train 400.

This embodiment has a low-power transmission mode (shown in the right half of FIG. 2), in addition to the normal-power transmission mode. In the low-power transmission mode, the wireless terminal 403 transmits a broadcast signal as in the normal-power transmission mode, but transmits it at lower power than in the normal-power transmission mode. The lower power is, for example, of such a level that enables the wireless terminal 403 to communicate with only the wireless base station located nearer than any other, with anything at half the distance between it and the nearest base station, or with anything at a specific distance, for example, 10 meters, from it. Thus, even in the low-power transmission mode, the wireless terminal 403 can reliably communicate with a base station present within a specific distance of it.

In the low-power transmission mode, the signal the wireless terminal 403 has transmitted reaches only one wireless base station (for example, wireless base station 102). If the wireless terminal 403 communicates with wireless base station 102 only, it can determine the operating state of wireless base station 102 (more precisely, whether the station 102 has a problem or is operating normally).

That is, the wireless terminal 403 is present near wireless base station 102, but wireless base station 102 can be considered to have a problem if data does not get through to the server 100 from the train 400.

The server 100 holds data representing whether the wireless terminal 403 is present near wireless base station 102. This is because the wireless terminal 403 keeps transmitting the data representing its position to the server 100. To achieve this, the server 100 has sent to the wireless terminal 403 a control signal that causes the wireless terminal 403 to assume the low-power transmission mode when or before the wireless terminal 403 moves to a position near wireless base station 102. Alternatively, the wireless terminal 403 may be set to the low-power transmission mode at specific intervals, and the server 100 may first determine the time the wireless terminal 403 moves to a position near wireless base station 102 and then monitors the transmission state at that time. In this case, the control can be easily performed because the wireless terminal 403 is set to the low-power transmission mode at specific intervals.

Thus, the data can be correctly transmitted from the train 400 to the server 100, also in the low-power transmission mode, unless the wireless terminal 403 or wireless base station 102 has a problem. However, the normal-power transmission mode should better be used to accomplish stable communication or to transmit data immediately as needed. In the normal-power transmission mode, the server 100 transmits a control signal to the wireless terminals upon detecting emergency data, inhibiting the wireless terminals from assuming the low-power transmission mode. As a result, the wireless terminals remain in the normal-power transmission mode at emergency, and can prevent the system from malfunctioning. At emergency, it is necessary to transmit reliable data or data demanded of high success probability.

In this embodiment, the normal-power transmission mode and the low-power transmission mode are used, switching one to the other as needed as will be described below. For example, the normal-power transmission mode is usually used, transmitting data at normal power, and the low-power transmission mode is used once in each second. In practice, however, the operating scheme is not limited to this example. The mode may be switched to the low-power transmission mode every time the train passes near a wireless base station.

The server 100 keeps determining the position of the train 400. This is because the train 400 transmits the position representing its position to the server 100 in the normal-power transmission mode. From the position data about the train 400, the server 100 determines which wireless base station the train 400 is passing by. The position data about wireless base stations 101, 102, . . . is stored in the server 100. The train 400 also transmits the train ID and various train state data (i.e., traffic congestion data, data showing the checked operating states of the devices mounted in the train, etc.).

As described above, the communication is not stable in the low-power transmission mode. The low-power transmission mode therefore is not suitable for transmitting important data. In view of this, the mode is switched from the low-power transmission mode to the normal-power transmission mode in order to transmit emergency data or important data.

Configuration of the Wireless Terminals

FIG. 3 specifies the configuration of the train regarding this embodiment. The train comprises a car-mounted control device 401, a position detection device 402, a wireless terminal 403, and a car-mounted antenna 405, all mounted on the train 400.

The position detection device 402 is connected to the car-mounted control device 401. As described above, the position detection device 402 may be a GPS or a tachogenerator. If constituted by a tachogenerator, the position detection device 402 can correctly determine the position to which the train 400 has moved.

The position detection device 402 detects the position of the train, generating train position data. The train position data is supplied to the car-mounted control device 401. The car-mounted control device 401 comprises a car-mounted message generation unit 4011 and a car-mounted timing control unit 4012.

The car-mounted message generation unit 4011 generates a message from the train position data received from the position detection device 402, in order to notify the server 100 of the position of the train. The message may include, in addition to the position of the train, the speed of the train, data about other trains, and multimedia data.

The car-mounted timing control unit 4012 controls the timing of switching the normal-power transmission mode to the low-power transmission mode, or vice versa. For example, the unit 4012 may set the system to the normal-power transmission mode for 0.95 seconds, and then to the low-power transmission mode for 0.05 seconds. The control data the car-mounted timing control unit 4012 outputs is supplied to the car-mounted power control unit 4034 arranged in the wireless terminal 403. The parameters, such as the time at which the system starts operating, the period for which the system operates, and the cycle in which the system operates, in the low-power transmission mode, can be preset to the car-mounted timing control unit 4012 or can be set to the unit 4012 from the server 100 in the wireless communication system.

The wireless terminal 403 has a packet generation unit 4031, a modulation unit 4032, a transmission RF unit 4033, a car-mounted transmission power control unit 4034, a reception RF unit 4035, a demodulation unit 4036, and a message reproducing unit 4037.

The packet generation unit 4031 has the function of converting the message generated by the car-mounted message generation unit 4011, to packets that will be sent to a wireless communication path. The packet generation unit 4031 further adds a header and control data to each packet body, corrects errors in data, adds the corrected data to the body of the packet body, and combines data items or splits data into items. The packet so modified is supplied to the modulation unit 4032.

The modulation unit 4032 performs, on the packet, modulation such as BPSK, QPSK, 16QAM or 64QAM, and performs, if necessary, secondary modulation such as orthogonal frequency division multiplexing (OFDM) or spectrum diffusion. The signal so modulated is supplied to the transmission RF unit 4033. The transmission RF unit 4033 changes the signal in terms of frequency. The signal changed in frequency is transmitted from the car-mounted antenna.

Assume that the transmission RF unit 4033 receives power control data from the car-mounted transmission power control unit 4034 and transmits a radio signal at the transmission power designated by the car-mounted transmission power control unit 4034.

The car-mounted transmission power control unit 4034 receives a timing signal for changing the transmission power, from the car-mounted timing control unit 4012. If the car-mounted timing control unit 4012 designates the low-power transmission mode, the car-mounted transmission power control unit 4034 instructs the transmission RF unit 4033 to transmit data at power lower than the low transmission power. Similarly, if the car-mounted timing control unit 4012 designates the normal-power transmission mode, the car-mounted transmission power control unit 4034 instructs the transmission RF unit 4033 to transmit data at the normal transmission power.

The wireless terminal 403 not only transmits data, but also receives data. Any signal the car-mounted antenna 405 has received is input to the reception RF unit 4035. The reception RF unit 4035 converts the signal to a reception baseband signal. The reception baseband signal is demodulated by the demodulation unit 4036. The signal so demodulated is supplied to the message reproducing unit 4037.

The message reproducing unit 4037 performs error-correction decoding and error detection on the packet, i.e., bit string, supplied from the demodulation unit 4036, and then combines data items or splits data into items, thereby reproducing the message the transmitted from the transmitting side. The message may contain control data about the normal-power transmission mode or low-power transmission mode. In this case, the message is supplied to the car-mounted timing control unit 4012.

The wireless terminal 403 can therefore be switched from the normal-power transmission mode to the low-power transmission mode, or vice versa, in accordance with the data about the transmission-power mode control data transmitted from the server 100.

Configuration of the Network Section

FIG. 4 shows the configuration of ground equipment according to the embodiment, which comprises a plurality of wireless base stations and a server. More precisely, the ground equipment has trackside antennas, wireless base stations 101, 102, 103, . . . , a wired network 200, and a server 100. The signals the receiving antennas have received are input to wireless base stations 101, 102, 103, . . . , respectively, and are converted to messages. The messages are supplied to the server 100 via the wired network 200. Further, the message the server 100 has generated and the timing control data for wireless base stations 101, 102, 103, . . . are transmitted to wireless base stations 101, 102, 103, . . . via the wired network 200.

Wireless base stations 101, 102, 103, . . . are identical in configuration. Therefore, only wireless base station 101 will be described as representative. Wireless base station 101 has a reception RF unit 1011, a demodulation unit 1012, a message reproducing unit 1013, a packet generation unit 1021, a modulation unit 1022, a transmission RF unit 1023, and a base-station transmission power control unit 1024.

The transmission RF unit 1023, base-station transmission power control unit 1024, message reproducing unit 1013, packet generation unit 1021, modulation unit 1022 and transmission RF unit 1023 perform functions similar to those of their counterparts incorporated in the wireless terminal 403 provided in the train.

More specifically, the reception RF unit 1023 receives a signal from the trackside antenna and converts the signal to a reception base band signal. The demodulation unit 1012 converts the reception base band signal it has received, to a bit string. The message reproducing unit 1023 reproduces a message from the bit string. The message thus reproduced is transmitted to the server 100 via the wired network 200.

The packet generation unit 1021 converts any message transmitted from the server 100 to a packet, to be transmitted to a wireless communication area. The packet is modulated by the modulation unit 1022, is changed in frequency by the transmission RF unit 1023, and transmitted by the base station antenna.

The base-station transmission power control unit 1024 may be used to enable the base-station section to operate in the base-station transmission power control unit 1024 and the low-power transmission mode. The base-station transmission power control unit 1024 instructs the transmission RF unit 1023 to transmit data, as the car-mounted transmission power control unit 4034 does, and can receive instructions about transmission power from the server 100 via the network 200.

In the normal-power transmission mode, for example, the control unit 1024 instructs the transmission RF unit 1023 to set the normal transmission power. In the low-power transmission mode, the control unit 1024 instructs the transmission RF unit 1023 to set the transmission power lower than the normal transmission power.

The server 100 has a fault detection unit 1001, a train position storage unit 1002, a control data generation unit 1003, a server-message generation unit 1004, and a base-station timing control unit 1005.

The fault detection unit 1001 detects faults, if any, in the wireless base stations or the wireless terminals, in accordance with a prescribed algorithm. The fault detection unit 1001 uses data representing the presence or absence of any signal coming from any wireless base station, any message received, and the train position data.

The train position storage unit 1002 stores the data representing the train position described in the message transmitted from the train via any wireless terminal and any wireless base station. The train position storage unit 1002 has a table showing train IDs and position data items. The position data items are associated with the train IDs and represent the positions of respective trains. Therefore, each train can be tracked, from time to time, with reference to the table. Any train position data is supplied to the control data generation unit 1003 and problem detection unit 1001.

The control data generation unit 1003 generates train control data from the train position data acquired from the train position storage unit 1002. The train control data represents, for example, the speed of the train and the tracks the train can run to. The train control data generated is supplied to the server-message generation unit 1004.

The server-message generation unit 1004 converts the train control data to a message. The message is transmitted via the network 200 to wireless base stations 101, 102, . . . . Different messages may be transmitted to wireless base stations 101, 102, . . . , respectively. Assume, however, that the same message is transmitted to wireless base stations 101, 102, . . . in the present embodiment.

The base-station timing control unit 1005 is configured to give timing data representing the time of starting the normal-power transmission mode or low-power transmission mode to each wireless base station through the wired network 200.

Operation Sequence in the Wireless Terminal

FIG. 5 is a diagram showing the operation sequence in the train 400. Data transmission is started in the train 400 (Step SA1). Before starting data transmission, the position detection device 402 detects the position of the train 400 (Step SA2). Then, the car-mounted message generation unit 4011 generates a message containing the train position data (Steps SA3). The car-mounted timing control unit 4012 refers to the time data, determining whether the low-power transmission mode should be set or not (Step SA4). If the low-power transmission mode should be set (Yes in Step SA4), the control unit 4012 instructs the car-mounted transmission power control unit 4034 to designate the low-power transmission mode to the transmission RF unit 4033 (Step SA5). The packet generation unit 4031 converts the received message to a packet (Step SA7). The packet is modulated by the modulation unit 4032, changed in frequency by the transmission RF unit 4033, and transmitted from the car-mounted antenna 405 (Step SA8). Then, the data transmission is terminated (Step SA9).

The normal-power transmission mode should be set (if No in Step SA4). In this case, the car-mounted transmission power control unit 4034 designates the normal-power transmission mode to the transmission RF unit 4033 (Step SA6). Then, the message is converted to a packet, the packet is modulated, changed in frequency, and transmitted from the car-mounted antenna 405, as in the low-power transmission mode.

Operation Sequence in the Network

FIG. 6 shows the sequence of detecting whether any problem or fault has occurred in the ground equipment (i.e., wireless base stations 1-1, 102, 103, . . . ).

First, the data reception process is started (Step SB1). Then, it is determined whether wireless base stations 101, 102, 103, . . . have received a radio signal from the train (Step SB2). If wireless base stations 101, 102, 103, . . . have received the radio signal from the train, the signal is demodulated, reproducing the message (Step SB3). These steps are performed by mainly the reception RF unit 1011, a demodulation unit 1012, a message reproducing unit 1013.

The message so reproduced is transferred to the server 100 via the wired network 200 (Step SB4). On receiving the message, the server 100 refers to the time data, determining whether the train is set to the low-power transmission mode or the normal-power transmission mode (Step SB5).

The train 400 may be switched, at intervals, from the low-power transmission mode to the normal-power transmission mode, and vice versa. In this case, the server 100 can predict the mode switching cycle in the train 400 and the time of switching the mode, from the data-reception history of the train 400. The server 100 keeps determining the position of the train 400 based on train position data. The server 100 further keeps determining the positions of wireless base stations 101, 102, 103, . . . . The server 100 can therefore determine in which mode the train 400 is transmitting the message, the low-power transmission mode or the normal-power transmission mode, as the train 400 passes by a wireless base station designated. The train 400 may determine in which mode, low or normal-power transmission mode, the message should be transmitted based on the instructions (designating, for example, message transmission time) received from the server 100, when the train 400 passes by a wireless base station designated. Also in this case, the server 100 can determine in which mode the train 400 is transmitting a message, low or normal-power transmission mode, as the train 400 passes by the wireless base station.

Assume that the server 100 determines that the train 400 is in the low-power transmission mode, and that the train position has been determined based on the message received from the train 400. Then, the wireless base station that has received the message (i.e., wireless base station designated) is identified. In this case, this wireless base station is considered to be operating normally because the data has correctly been received by the server 100 from the train 400 (Step SB9). Then, the data reception is terminated (Step SB7).

If the server 100 determines that the train 400 is receiving a radio signal in the normal-power transmission mode (No in Step SB5), data has probably gotten through via wireless base stations 101, 102, 103, . . . . Therefore, it is difficult for the server 100 to determine whether a problem or a fault has occurred in any of the wireless base stations or whether all wireless base stations are operating normally. Therefore, the server 100 stores the data representing the train position (Step SB6), not determining whether the wireless base stations have a problem or not. Then, data reception is terminated (Step SB7).

A case will be described, in which the wireless base station designated does not receive the radio signal at the time the train 400 must transmit the message. If the wireless base station does not receive the radio signal (No in Step SB2), the server 100 determines whether it is the time the train 400 should transmit the message (Step SB11). If the train 400 should transmit the message, the server 100 determines whether the train 400 is set to the low-power transmission mode (Step SB12). If the train 400 is set to the low-power transmission mode, the server 100 determines whether the train 400 is at such a position that the train 400 can communicate with the nearest wireless base station (i.e., station designated) (Step SB13). If the train 400 is at such a position (Yes in Step SB13), the wireless base station designated is considered to have a problem, because the server 100 does not receive a signal, nevertheless (Step SB14).

If the train 400 is remote from the wireless base station and is, therefore, unable to receive a signal in the low-power transmission mode (No in Step SB13), the server 100 will stop the data reception (Step SB7).

At the time the train 400 must transmit the message and must transmit a signal in the normal-power transmission mode, the wireless base stations can receive the signal. If the wireless base stations do not receive the signal, nevertheless, the server 100 determines that the wireless terminal 403 of the train 400 has a problem (Step SB15). In this case, the server 100 terminates the data reception process.

In the method described above, whether any wireless base station or any wireless terminal may have a problem can be determined based on the position data and transmission-power mode data about the train.

In this embodiment, each wireless terminal operates in the low-power transmission mode at specific intervals. The interval may be set to the wireless terminal beforehand. Alternatively, it may be set to the train by using the message transmitted from the server.

The low-power transmission mode may be activated in another method. In this method, the position data about the wireless base stations is stored in the train 400, and the train 400 is set to the low-power transmission mode when it determines that it is approaching a wireless base station, from the data representing its own position. Alternatively, the train 400 may enter the low-power transmission mode in accordance with the instructions coming from the wireless base station.

As explained above, the wireless terminal of a train and the server 100 communicate with each other, thereby identifying any wireless base station that may have a problem or a fault. Instead, whether any wireless base station designated has a problem or not may be determined from the results of checking the communication points between the server 100 and the wireless terminal of every train. That is, when the train having the wireless terminal found to be operating normally passes a wireless base station considered to have a problem, the wireless terminal of the train is set to the low-power transmission mode. At this point, the server 100 may not able to receive a signal from the wireless terminal of the train. In this case, the wireless terminal of the train is determined to have a problem.

Second Embodiment

Power is Deduced in Base Stations

The second embodiment will be described with reference to the drawing. In the first embodiment, the transmission power of the train 400 is decreased, thereby determining whether any wireless base station or any wireless device (i.e., wireless terminal) has a problem or not. In the second embodiment, one of the features is to decrease the transmission power of a wireless base station. The second embodiment may be used together with the first embodiment. The second embodiment is identical in configuration to the first embodiment. Ground equipment and a train om the second embodiment therefore have configurations identical to those shown in FIG. 2 and FIG. 3, respectively.

Operation Sequence in the Network

Figure 7:
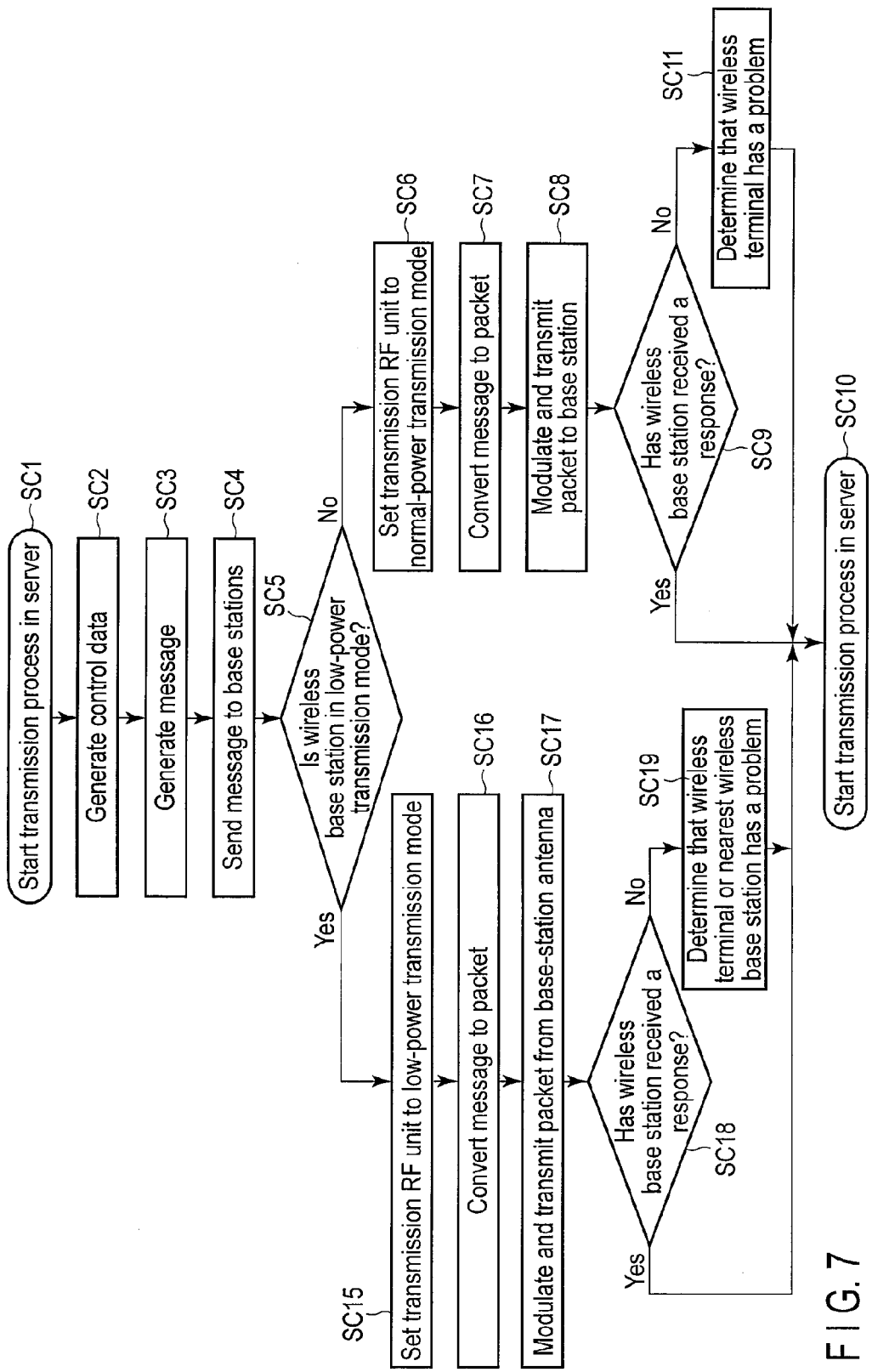
FIG. 7 is a diagram showing the flow of an operation performed trackside in another embodiment.

The operation sequence in the ground equipment (i.e., stationary section) of this embodiment will be explained, with reference to FIG. 7 and FIG. 4.

First, the server 100 starts a transmission process (Step SC1). The server 100 then generates control data (Step SC2) and generates a message containing the control data (Step SC3). The control data may include the position information to which the train is allowed to run, the maximum speed, the operating states of railway switches, and the ruote state of rails. The message is transmitted to wireless base stations 101, 102, 103, . . . via the wired network 200 (Step SC4).

Further, the server 100 determines whether any wireless base station has been set to the low-power transmission mode (Step SC5). This decision is made in the base-station timing control unit 1005. Based on train position data, the server 100 determines whether the server 100 can communicate with any train if the operating mode is switched to the low-power transmission mode. When the low-power transmission mode is set to the wireless base stations, the number of wireless base stations decrease from which the train 400 receives signals compared with when the normal-power transmission mode is set to the wireless base stations. The train 400 can communicate with a wireless base station if the train 400 runs near the wireless base station. If the train 400 is at the midpoint between two adjacent wireless base stations, the train 400 and one or other of the wireless base stations may not receive a radio signal from each other.

In view of this, an area is checked beforehand, in which each wireless base station can receive a signal from, and transmit a signal to, the train as the train passes near the wireless base station. The server 100 holds a table showing the checked communication areas. From this table the server 100 may determine that the train 400 cannot communicate with any wireless base station. In this case, the server 100 no longer attempts to achieve communication in the low-power transmission mode, sets wireless base stations 101, 102, 103, . . . to the normal-power transmission mode, and starts communicating with the train 400.

It will be explained how the system enters low-power transmission mode (if Yes in Step SC5). The base-station timing control unit 1005 instructs, via the wired network 200, the control unit 1024 to designate the low-power transmission mode (Step SC15).

On receiving the message, each of wireless base stations 101, 102, 103, . . . converts the message to a packet (Step SC16) and modulates the packet. The packet modulated is transmitted from the base station antenna (Step SC17). At this point, the wireless base station is set to the low-power transmission mode. Therefore, the control unit 1024 sets the low power to the transmission RF unit 1023. As a result, the packet is transmitted at the low power.

Then, wireless base stations 101, 102, 103, . . . wait for a response from the train (Step SC18). If the wireless base station nearest the train receives a response from the train, the wireless base station transmits the response to the problem detection unit 1001 of the server 100. The problem detection unit 1001 determines which wireless base station has received the response, from the train position data. This decision is made on the basis of a table that shows, for example, the wireless base stations and the positions where the train communicate with the base stations, respectively.

If the server 100 receives the message sent back from the train, the server 100 determines that the wireless base station found to have received the response and the wireless terminal provided in the train 400 are operating normally.

If the train does not timely respond to the packet transmitted from the wireless base station, the server 100 determines (Steps SC19 and SC10) that:

(a) The wireless base station nearest the train has a problem, failing to transmit the signal back;

(b) The wireless base station nearest the train has a problem, failing to receive the response from the train;

(c) The wireless terminal mounted in the train has a problem, failing to receive the signal; or (d) The wireless terminal mounted in the train has a problem, failing to transmit the response.

The transmission may not be performed in the low-power transmission mode, but in the normal-power transmission mode (No in Step SC5). In this case, the base-station timing control unit 1005 instructs, via the wired network 200, the control unit 1024 of each of wireless base stations 101, 102, 103, . . . to designate the normal-power transmission mode to the transmission RF unit 1023 (Step SC6). The message transmitted from the server 100 via the wired network 200 is converted to a packet. The packet is modulated (Step SC7) and is transmitted from the base station antenna (Step SC8).

On receiving the response from the wireless terminal 403, the wireless base station notifies the server 100, more precisely the problem detection unit 1001, of the receipt of the response. Therefore, the transmission is performed in the normal-power transmission mode, and signals reach the train via wireless base stations 101, 102, 103, . . . . Wireless base stations 101, 102, 103, . . . therefore receives the response from the train (Yes in Step SC9). Then, the transmission process is terminated (Step SC10).

Wireless base stations 101, 102, 103, . . . may not receive the response within a prescribed time, that is, if the server 100 is not notified of the receipt of the response, the server 100 can be determined that the wireless terminal 403 probably has a problem (Step SC11). In this case, too, the transmission process is terminated (Step SC10).

Operation Sequence in the Wireless Terminal

Figure 8:
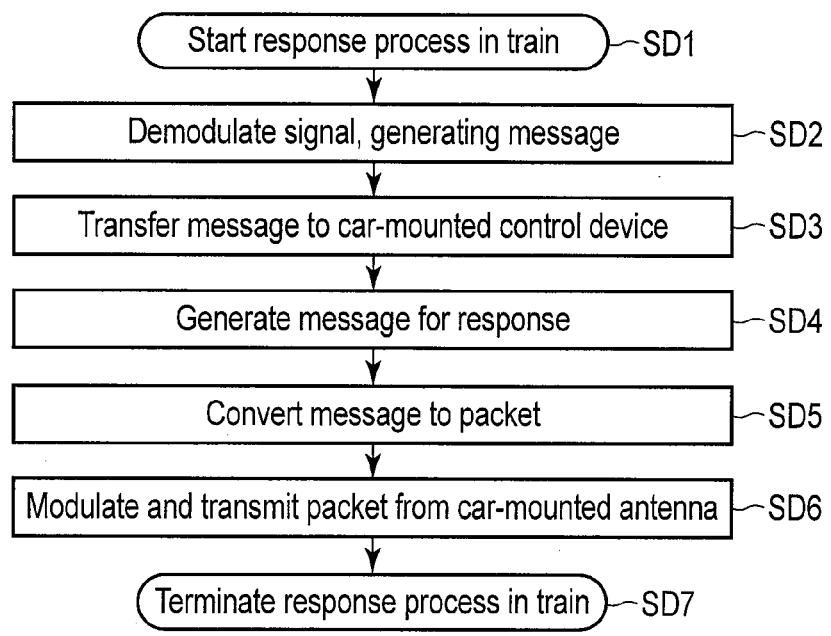
FIG. 8 is a diagram showing the flow of an operation performed in the train in the other embodiment.

FIG. 8 shows the operation sequence in the train section of this embodiment. If the car-mounted antenna receives a signal, the demodulation unit 1012 demodulates the signal, reproducing the message (Step SD1). The message reproduced is transmitted to the car-mounted control device 401 (Step SD2). The car-mounted control device 401 generates a message, or response to the infrastructural section. The message only needs to show is nothing more than a response, and need not show anything else. Nonetheless, the message may contain position data or any other data. The message is converted to a packet (Step SD5). The packet is modulated and transmitted from the car-mounted antenna (Step SSD6).

In this embodiment, the low-power transmission mode is set at intervals under the control of the base-station timing control unit 1005 incorporated in the server 100. Instead, the low-power transmission mode may be set every time the train 400 approaches a wireless base station. Even while the system remains in the low-power transmission mode, the communication may be performed in the normal-power transmission mode in response to, if any, an emergent request.

Third Embodiment

Intra-Base Station Communication

Basic Concept

The third embodiment will be described with reference to the drawing. In the third embodiment, the wireless base stations receive and transmit signals from and to one another, thereby to detect problems, if any, in the wireless base stations. Any signal transmitted from one wireless base station may, however, reach many other adjacent base stations, and may influence the communication between the wireless base station and the wireless terminal. Therefore, data is transmitted in the low-power transmission mode, and the wireless terminal communicates with only the wireless base stations close to the wireless terminal. Whether the base stations can communicate with one another is determined, thereby to detect problems, if any.

The third embodiment has the same system configuration as shown in FIG. 1. The ground equipment of the third embodiment is identical in configuration to those shown in FIG. 3.

Operation Sequence in the Network

Figure 9:
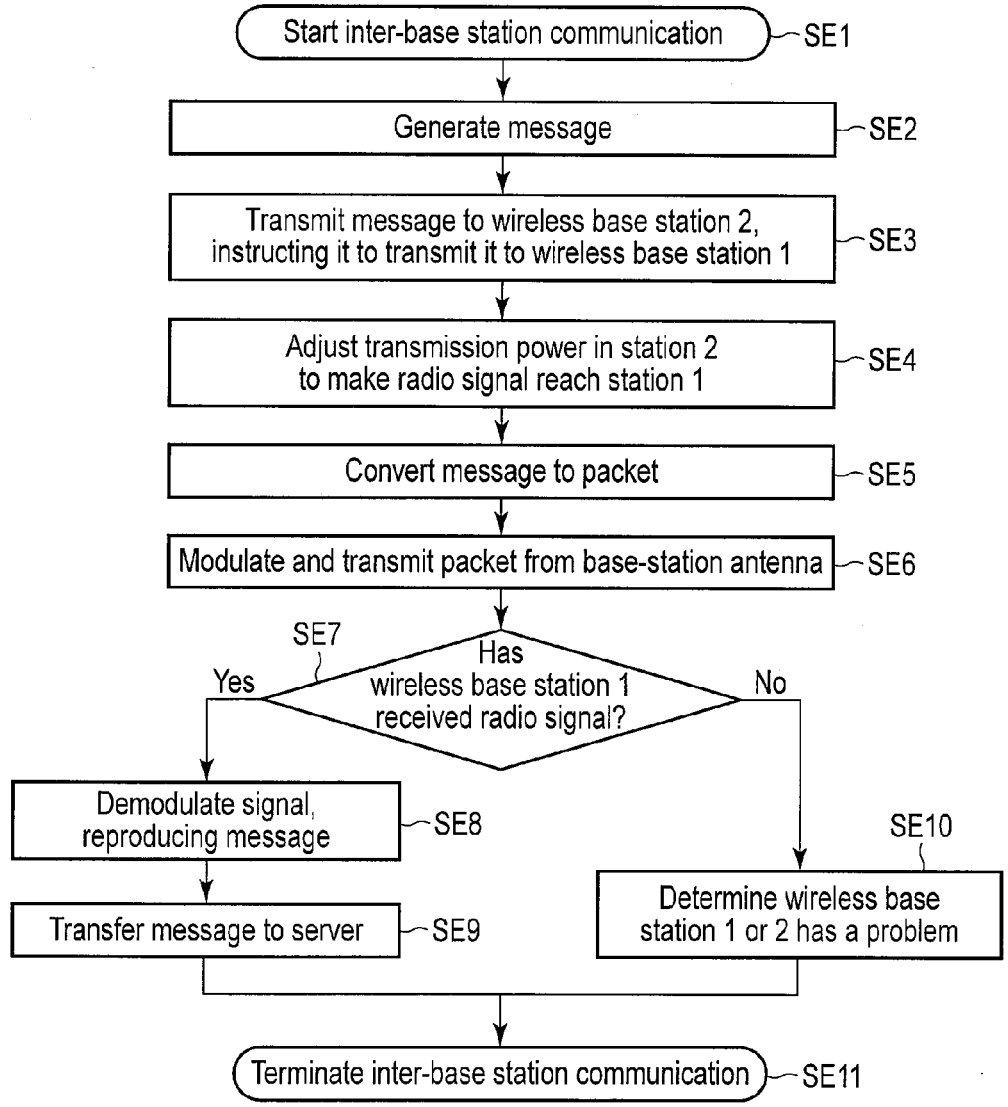
FIG. 9 is a diagram showing the flow of an operation performed trackside in still another embodiment.

FIG. 9 shows the operation sequence in the ground equipment of this embodiment. It will be described how a signal is transmitted from wireless base station 102 to wireless base station 101 (both shown in FIGS. 1 and 2), to thereby detect problems.

First, the server 100 generates a message (Steps SE1 and SE2). Then, the server 100 transmits the message to wireless base station 102 and, at the same time, to wireless base station 101 (Step SE3). On receiving the message, wireless base station 102 adjusts the transmission power, increasing the transmission power so that the signal will reach wireless base station 101 (Step SE4). In the normal operating state, the communication area of any wireless base station may expand, overlapping that of an adjacent wireless base station. In this case, the transmission power is reduced to a level, preset on the basis of experiment, necessary for wireless base station 102 to transmit a signal to wireless base station 101. If a signal transmitted from wireless base station 102 does not reach wireless base station 101 in the normal operating state, the transmission power will, if possible, be increased.

Wireless base station 102 converts the message to a packet (Step SE5). Then, wireless base station 102 modulates the packet and transmits the modulated packet via the base station antenna (Step SE6). Wireless base station 101 determines whether a signal has been received from wireless base station 102 (Step SE7). If wireless base station 101 has received a signal from wireless base station 102, the signal is demodulated (Step SE8). When the message is successfully reproduced, wireless station 101 notifies the server 100 of this event (Step SE9).

If notified that wireless base station 101 has received the message, the server 100 determines that wireless base stations 102 and 101 are correctly performing the transmission function and the reception function, respectively (Step SE10).

A message-receipt report may not come from wireless base station 101 within a prescribed time after the server 100 has instructed to wireless base station 102 to transmit the message back. In this case, the server 100 determines that wireless base station 102 has a problem in its transmission function or that wireless base station 101 has a problem in its reception function.

In this system, it cannot be determined which function has failed, the transmission function of wireless base station 102 or the reception function of wireless base station 101. If wireless base station 102 transmits a signal to wireless base station 103, but no message-receipt report comes from wireless base station 103, however, it is determined that the transmission function of wireless base station 102 or the reception function of wireless base station 103 has failed. It can then also be determined, in view of the decision already made, that wireless base station 102 probably has a problem in its transmission function.

This system can be practiced in combination with any other embodiment described above. For example, if any wireless base station is found to have a problem in the embodiment of FIG. 6 or FIG. 7, the embodiment of FIG. 9 can be utilized to determine whether this wireless base station really has a problem.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The technical terms used above in relation to the embodiments and the names or technical terms described in the drawings are in no way restrictive. For example, the unit, apparatus, device, station or terminal may be replaced with means, a device, or a module. Likewise, a control device, a detection device, a generation unit, a modulation unit, a transmission RF unit, a control unit, a reception RF unit, a demodulation unit, a reproducing unit may be replaced, respectively, with a controller, a detector, a generator, a modulator, a transmitter, a receiver, a demodulator, a reproducer.

Further, the server 100 may include a management device, a storage device, a base station designating device, and a decision device.

The management device is configured to manage position data about the base stations. The storage device is configured to store position data transmitted from the base stations. The a base station designating device is configured to designate one of the base stations in accordance with the position data stored in the storage device and the position data managed in the management device. The decision device is configured to determine that the base station designated has a problem if the server does not receive the signal the wireless station has transmitted in the second mode.

What is claimed is:

1. A wireless communication system comprising a wireless terminal, a plurality of base stations configured to perform wireless communication with the wireless terminal, and a server connected to the base stations via a network,
   the wireless terminal comprising:
      a wireless communication device configured to communicate with the base stations;
      a position data transmission device configured to transmit a signal containing position data of a train to which the wireless terminal is provided to the server via the wireless communication device; and
      a transmission power controller configured to switch the wireless communication device between a first mode in which the wireless communication device transmits data at normal power and a second mode in which the wireless communication device transmits data at power smaller than the normal power, and
   the server comprising:
      a management device configured to manage position data of the base stations;
      a storage device configured to store the position data of the train transmitted from the wireless terminal via at least one of the base stations;
      a base station designating device configured to designate one of the base stations in accordance with the position data of the train stored in the storage device and the position data of the base stations managed in the management device; and
      a decision device configured to determine that the base station designated by the base station designating device has a fault when the server does not receive the signal transmitted from the wireless terminal, when the wireless terminal is in the second mode.

2. The wireless communication system of claim 1, wherein the transmission power controller switches the wireless communication device from the first mode to the second mode in accordance with a control signal received from the server via the wireless communication device.

3. The wireless communication system of claim 2, wherein the control signal is transmitted when the server determines that a distance between the train and one of the base stations falls within a prescribed range, the distance being determined based on the position data of the train and the position data of the base stations managed in the management device.

4. The wireless communication system of claim 1, wherein the transmission power control device switches the wireless communication device between the first and second modes at preset intervals or intervals designated by the server.

5. The wireless communication system of claim 1, wherein the transmission power control device switches the wireless communication device to the first mode when transmitting emergency data in the second mode.

6. The wireless communication system of claim 1, wherein the transmission power control device switches the wireless communication device to the first mode when transmitting important data in the second mode.

7. A wireless communication system comprising a wireless terminal, a plurality of base stations configured to perform wireless communication with the wireless terminal, and a server connected to the base stations via a network,
   each of the base stations comprising:
      a first wireless communication device configured to perform the wireless communication with the wireless terminal; and
      a transmission power control device configured to switch the first wireless communication device between a first mode in which the first wireless communication device transmits data at normal power and a second mode in which the first wireless communication device transmits data at power smaller than the normal power,
   the wireless terminal comprising:
      a second wireless communication device configured to perform wireless communication with the base stations; and
      a position data transmission device configured to transmit a signal containing position data of a train to which the wireless terminal is provided to the server via the second wireless communication device and the first wireless communication device, and
   the server comprising:
      a management device configured to manage position data of the base stations;
      a storage device configured to store the position data of the train transmitted from the wireless terminal via at least one of the base stations;
      a base station designating device configured to designate one of the base stations in accordance with the position data of the train stored in the storage device and the position data of the base stations managed in the management device;
      a transmission device configured to transmit a signal to the wireless terminal via the base station designated by the base station designating device; and
      a decision device configured to determine that at least one of the wireless terminal and the base station designated by the base station designating device has a fault when no signal is received from the wireless terminal in response to the signal transmitted via the base station, when the base station designated by the base station designating device is in the second mode.

8. The wireless communication system of claim 7, wherein the transmission power control device switches the first mode to the second mode in accordance with a control signal received from the server.

9. The wireless communication system of claim 8, wherein the control signal is transmitted when the server determines that a distance between the train and one of the base stations falls within a prescribed range, the distance being determined based on the position data of the train and the position data of the base stations managed in the management device.

10. The wireless communication system of claim 7, wherein the decision device determines that the wireless terminal has a fault, when no signal is received from the wireless terminal in response to signals the base stations have transmitted to the wireless terminal in the first mode.

* * * * *